W. McDonald.

Mitring Printers' Rule.

No 2899 Reissued Mar. 17, 1868.

UNITED STATES PATENT OFFICE.

R. HOE & CO., OF NEW YORK, N. Y., ASSIGNEES OF WM. McDONALD, OF SAME PLACE.

IMPROVED MACHINE FOR MITERING PRINTERS' RULES.

Specification forming part of Letters Patent No. 13,197, dated July 3, 1855; Reissue No. 2,899, dated March 17, 1868.

*To all whom it may concern:*

Be it known that W. McDONALD, of the city, county, and State of New York, invented a new and Improved Machine for Mitering the Ends of Printers' Rules for Forming Miter-Joints; and we do hereby declare the following to be a full, clear, and exact description thereof, reference being had to the accompanying drawings, figures, and letters of reference thereon, making part of this specification.

Figure 1:
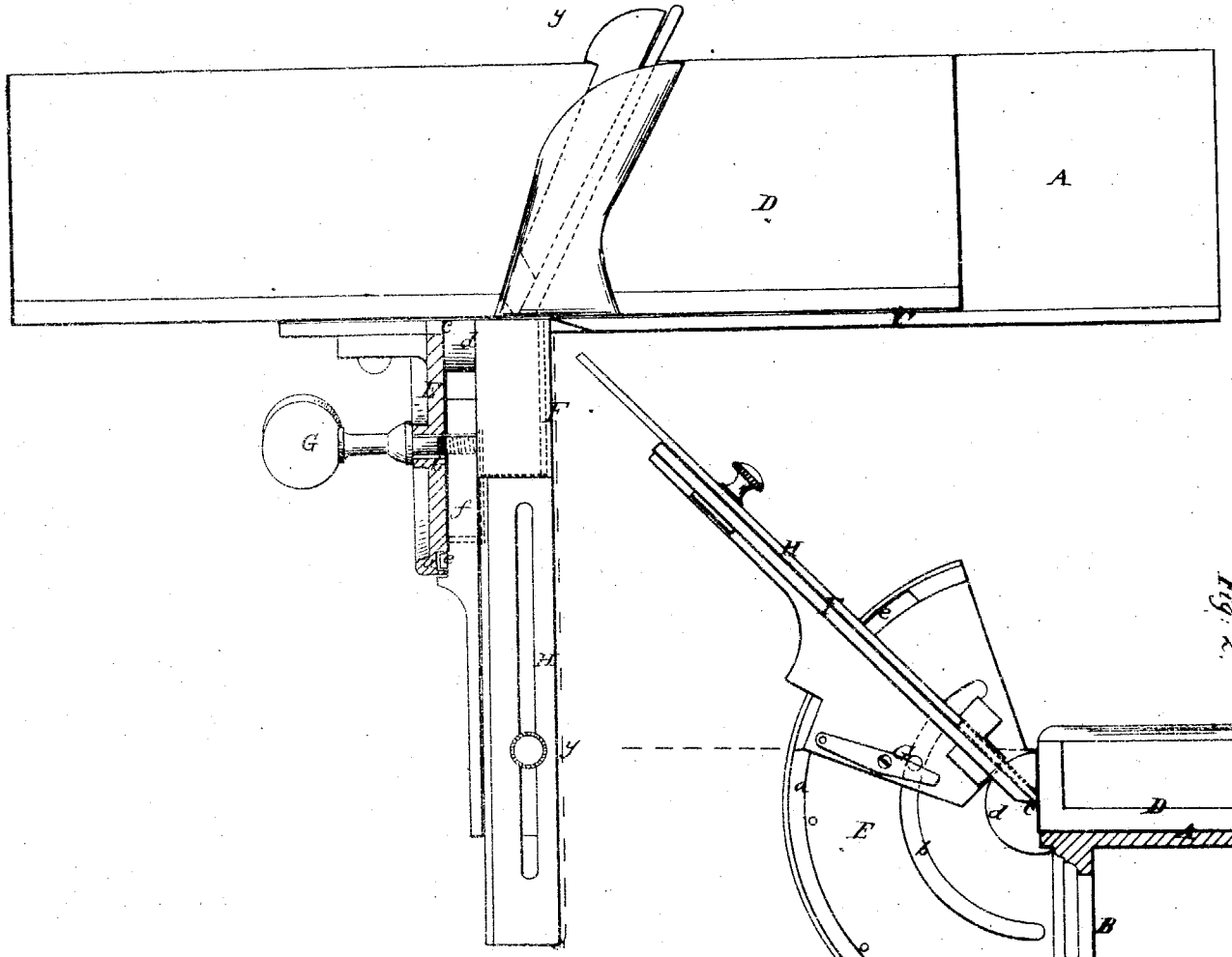
Figure 2:
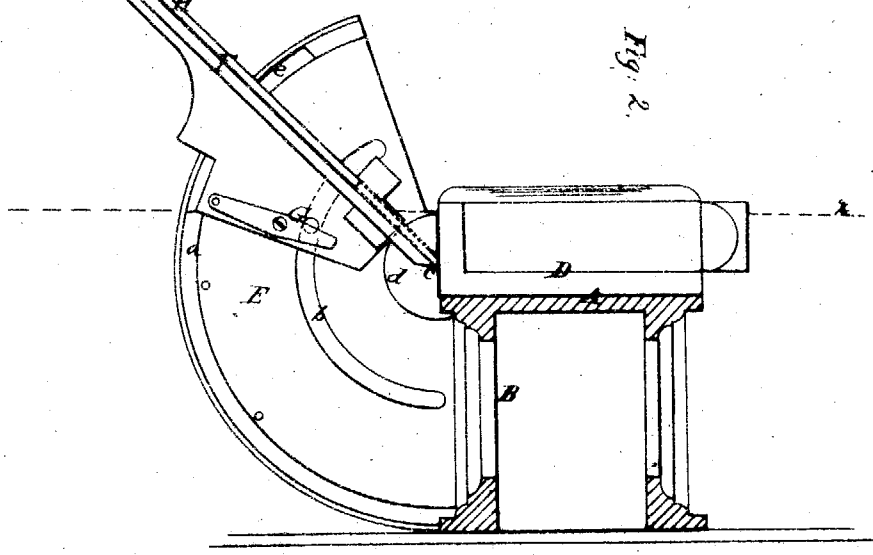

Figure 1 is a plan or top view of the improved machine, the sector guide-plate being bisected horizontally, as indicated by the line *x x*, Fig. 2. Fig. 2 is a transverse section of the same, *y y*, Fig. 1, showing the plane of section.

Similar letters of reference indicate like parts in the drawings.

The invention consists in combining with a movable cutter a sector guide-plate and its adjusting and holding mechanism, whereby the apparatus may be raised or lowered to any required angle, and the rule may be cut as desired.

To enable others skilled in the art to make and use said invention, we will describe its construction and operation.

A is a horizontal cast-iron plate, which is supported upon a suitable bed, B. The upper surface of this plate is planed and made smooth, and on one side is provided with a vertical projecting ledge, C.

D represents a cutter the face of which rests against the inner surface of the ledge or projection C, while the body rests upon the plate A.

E represents a sector guide-plate attached to the plate A or framing supporting the same. This guide-plate is placed in a vertical position and projects at right angles from the bed A. On one side of the sector-plate, near its edge, there is cut a groove, *a*, concentric with the circular edge of the plate, and a curved slot, *b*, is cut through the sector-plate concentric with the groove *a*, as plainly shown in Fig. 2. At the center *c* there is attached to the sector-plate a semicircular plate or hub, *d*, F represents a bed-plate formed of metal. having a projection, *e*, attached to one of its sides, which projection fits into the groove or recess *a* in the sector-plate E.

G, Fig. 1, is a set-screw which passes through the curved slot *b* and into the side of the plate F. The inner side of the plate E has a ledge or projection, *f*, upon it, and the lower or inner end of this ledge or projection bears against the periphery of the hub or semicircular plate *d*. The other portion of the lever or inner end of the bed F extends as far as the upper edge of the ledge or projection C on the plate A, the ledge C being cut away underneath the edge of the bed F. On the upper surface of this bed F there is an adjustable gage, H.

By operating the set-screw G the bed F may be raised or lowered and secured at any desired point, the inner or lower edge of the bed F being at all times at the same point on a line with the upper part of the ledge or projection C. The rule (shown in red) is placed upon the bed F, the back edge of the rule bearing against the ledge *f*, and the end of the rule to be mitered against the face of the cutter D. By reciprocating the cutter D the end of the rule will be mitered or cut at an angle coincident to the angle of the bed F, and the end of the rule may be mitered in either direction by moving the bed above or below the plane of the bed or plate A.

The object of mitering the ends of rules is to form joints in locking the rules together in rectangular forms for borders inclosing the type.

What is claimed as the invention of W. McDONALD is—

The combination, with a movable cutter, of a sector guide-plate, a rule-holding bed, and adjusting mechanism, constructed and operating substantially as described, and for the purposes specified.

R. HOE & CO.

Witnesses:
C. A. DURGIN,
EDWARD E. OSBORN.